US 9,262,860 B2

(12) United States Patent
Kulla et al.

(10) Patent No.: US 9,262,860 B2
(45) Date of Patent: Feb. 16, 2016

(54) SYSTEM AND METHOD FOR IMPORTANCE SAMPLING OF AREA LIGHTS IN PARTICIPATING MEDIA

(75) Inventors: Christopher Kulla, Los Angeles, CA (US); Marcos Fajardo Orellano, Madrid (ES)

(73) Assignees: Sony Corporation, Tokyo (JP); Sony Pictures Technologies, Inc., Culver City, CA (US); SOLID ANGLE SL, Madrid (ES)

( * ) Notice: Subject to any disclaimer, the term of this patent is extended or adjusted under 35 U.S.C. 154(b) by 314 days.

(21) Appl. No.: 13/399,584

(22) Filed: Feb. 17, 2012

(65) Prior Publication Data

US 2012/0256939 A1 Oct. 11, 2012

Related U.S. Application Data

(60) Provisional application No. 61/444,033, filed on Feb. 17, 2011, provisional application No. 61/515,706, filed on Aug. 5, 2011.

(51) Int. Cl.
*G09G 5/02* (2006.01)
*G06T 15/50* (2011.01)

(52) U.S. Cl.
CPC ..................................... *G06T 15/506* (2013.01)

(58) Field of Classification Search
CPC ................................ G09G 5/02; G06T 11/001
USPC ........................................................ 345/589
See application file for complete search history.

(56) References Cited

U.S. PATENT DOCUMENTS

| | | | |
|---|---|---|---|
| 2007/0206008 A1* | 9/2007 | Kaufman et al. | 345/424 |
| 2007/0285422 A1* | 12/2007 | Nayar et al. | 345/426 |
| 2009/0006044 A1* | 1/2009 | Zhou et al. | 703/2 |
| 2009/0219287 A1 | 9/2009 | Wang et al. | |
| 2009/0226049 A1 | 9/2009 | Debevec et al. | |
| 2010/0085360 A1* | 4/2010 | Ren et al. | 345/426 |
| 2010/0164974 A1* | 7/2010 | Fairclough | 345/582 |
| 2011/0012901 A1* | 1/2011 | Kaplanyan | 345/426 |
| 2011/0043522 A1 | 2/2011 | Zhou et al. | |

FOREIGN PATENT DOCUMENTS

WO   WO2010/094619   *   2/2009   ............. G06T 15/60

OTHER PUBLICATIONS

Chris Wyman and Shaun Ramsey. "Interactive Volumetric Shadows in Participating Media with Single-Scattering." IEEE Symposium on Interactive Ray Tracing, 87-92. (Aug. 2008).*

(Continued)

*Primary Examiner* — Devona Faulk
*Assistant Examiner* — Jin Ge
(74) *Attorney, Agent, or Firm* — Mark D. Wieczorek; Mayer & Williams PC

(57) ABSTRACT

Provided are systems and methods that address the problem of single scattering in homogeneous volumes. In one implementation, an importance sampling technique is provided that avoids a singularity near point light sources. The system and method can be extended to the situation of area lights of arbitrary shapes. The error caused by the non-constant distance to the finite-extent area light is distributed by using random sample points within the area light as points from which lighting is calculated for sampling points along the ray.

17 Claims, 8 Drawing Sheets

(56) References Cited

OTHER PUBLICATIONS

Jarosz, W., Donner, C., Zwicker, M., and Jensen, H. W. 2007. Radiance caching for participating media. In ACM SIG-GRAPH 2007 Sketches.*

Veach, E., and Guibas, L. J. 1995. Optimally combining sampling techniques for monte carlo rendering. In SIGGRAPH '95, 419.428.*

Engelhardt, T., Nov'a K, J., and Dachsbacher, C. 2010.Instant multiple scattering for interactive rendering of heterogeneous participating media. Tech. rep., Karlsruhe Institute of Technology, Dec.*

Raab, M., Seibert, D., and Keller, A. 2006. Unbiased global illumination with participating media. In Proc. Monte Carlo and Quasi-Monte Carlo Methods 2006, 591-605.*

Walter et al. (Walter, B., Zhao, S., Holzschuch, N., and Bala, K. 2009. Single scattering in refractive media with triangle mesh boundaries. ACM Trans. Graph. 28, 3, 1-8.*

Morley R. K., Boulos S., Johnson J., Edwards D., Shirley P., Ashikhmin M., Premože S.: Image synthesis using adjoint photons. Graphics Interface 2006, pp. 179-186. 2.*

Pegoraro, V., and Parker, S. 2009. An analytical solution to single scattering in homogeneous participating media. Computer Graphics Forum 28, 2.*

Thomas Engelhardt et al., "Instant Multiple Scattering for Interactive Rendering of Heterogeneous Participating Media," Dec. 8, 2010, Technical Report, Karlsruhe Institute of Technology. http://cg.ibds.kit.edu/downloads/InstantMultipleScatteringTechReport08Dec2010.pdf.

* cited by examiner

SYSTEM AND METHOD FOR IMPORTANCE SAMPLING OF AREA LIGHTS IN PARTICIPATING MEDIA

CROSS-REFERENCE TO RELATED APPLICATIONS

This application claims benefit of priority of U.S. Provisional Patent Application Ser. No. 61/515,706, filed Aug. 5, 2011, entitled "Importance Sampling of Area Lights in Participating Media", and U.S. Provisional Patent Application Ser. No. 61/444,033, filed Feb. 17, 2011, entitled "Importance Sampling of Area Lights in Participating Media", both of which are owned by the assignee of the present invention and incorporated by reference herein in their entirety.

BACKGROUND

The problem of simulating light transport in participating media has been extensively studied. One aspect is the problem of efficiently computing the single scattering component from point light sources, including spotlights. Such light sources account for most dramatic high frequency lighting effects, such as light beams and volumetric shadowing. In addition, such light sources serve as a significant source of noise in homogeneous media because the other aspect, the transmission term, is generally nonzero and smoothly varying, and thus comparatively non-noisy.

Previous work in unbiased volume rendering has concentrated on efficient importance sampling of the transmission term. In one approach, the single scattering integral is estimated by jittered ray marching with a uniform step size $\Delta x$. As an improvement, this step size can be made adaptive by responding to local changes in the illumination, or by making the same a function of the extinction coefficient.

Nevertheless, such solutions require significant computational efforts and time. Consequently, there remains a need for a better way to perform such rendering.

SUMMARY

Systems and methods are provided that address the problem of single scattering in homogeneous volumes. In one implementation, an importance sampling technique is provided that avoids singularities near point light sources, e.g., by using points distributed along a ray of sample points in an equi-angular fashion. In this way, light is spread proportionally to illumination changes along the ray. The system and method can be extended to the situation of area lights of arbitrary shapes, in which case the error caused by the non-constant distance to the finite-extent area light is distributed by using random sample points within the area lights, from which radiance is estimated, as point light sources. The above equi-angular points are then sampled relative to these point light sources.

In one aspect, the invention is directed towards a method of rendering a scene, the scene including a homogeneous participating media illuminated by a light source, including: defining a virtual ray extending from a point or pixel on a virtual viewing plane; defining a series of sampling points along the ray, the sampling points spaced equi-angularly with respect to a light source; and calculating a contribution to an image at the point or pixel from each sampling point due to illumination by the light source through a homogeneous participating media.

Implementations of the invention may include one or more of the following. The virtual ray may be perpendicular to the plane. The method may further include summing each calculated contribution over the series of sampling points. Virtual rays may be defined for each point or pixel in the virtual viewing plane, and the method may further include combining each summed contribution from each point or pixel to result in a rendered image. The light source may be an area light and the method may further include, for each sampling point, choosing a random point within the area light and basing the calculating on illumination from the random point. The light source may be an area light and the method may further include: for each sampling point, defining a new series of sampling points along the ray, the new series of sampling points spaced equi-angularly with respect to the light source; and for each new sampling point in the series, choosing a random point within the area light, and basing the calculating on illumination from the random point. The light source may be selected from the group consisting of: a spherical light source, a textured light source, a circular light source, a quad light source, a toroidal light source, a rectangular light source, and combinations of the above. The sampling points may be arranged according to the distribution:

$$t_i = D \tan[(1-\xi_i)\theta_a + \xi_i\theta_b)] \text{ for } \xi i\, [0,1).$$

The rendered image may contain a plurality of high variance speckles, and the method may further include masking the speckles by performing a clamping step. The method may further include performing a multiple importance sampling step by employing several different types of sampling and combining the sampling method using an appropriate weighting. The method may include a step of phase function sampling. The light source may be an area light and method may further include, for each contribution to be calculated, integrating over the area light and basing the calculating on the integration. The light source may be an area light and the method may further include, for each contribution to be calculated, using an analytic solution for the illumination by the area light and basing the calculating on the analytic solution for the illumination. The steps of defining a virtual ray, defining a series of sampling points, and calculating a contribution, may be performed by a Monte Carlo-based renderer.

In another aspect, the invention is directed towards a non-transitory computer readable medium, including instructions for causing a computing device to perform the above method.

In another aspect, the invention is directed towards a rendering module, implemented on a non-transitory computer readable medium, for rendering scenes including homogeneous participating media illuminated by a light source, including: a sampling module, implemented on a non-transitory computer readable medium, for constructing a series of sampling points along a ray, the sampling points spaced in an equi-angular fashion with respect to a light source; a point contribution module, implemented on a non-transitory computer readable medium, for calculating the contribution of the light source to an image of a homogeneous participating media at a point on a viewing plane, the calculated contribution resulting in a color to be applied at the point by a shader; and a combination module, implemented on a non-transitory computer readable medium, for combining the colored points to result in a rendered image.

Implementations of the invention may include one or more of the following. The light source may be an area light, and the module may further include an area light module for providing a signal to the point contribution module pertaining to the area light, the signal providing at least a random location within the area light, and a light power associated with the location. The module may further include a multiple importance sampling module for performing a multiple importance sampling step. Density sampling may be employed in the multiple importance sampling. The module may further include a clamping module for performing a clamping step on the rendered image.

In another aspect, the invention is directed towards a method of rendering a scene, the scene including a participating media illuminated by an area light source, including: defining a virtual ray extending from a point or pixel on a virtual viewing plane; choosing a random point within the area light; defining a series of sampling points along the ray; and calculating a contribution to an image at the point or pixel from each sampling point due to illumination from the random point through a participating media.

Advantages of the systems and methods according to the principles described here may include one or more of the following, according to implementation. The systems and methods allow the successful solution of area lights in participating media, even in challenging cases, such as stretched rectangular lights, textured area lights, or the like. Systems and methods according to the principles described here may be enhanced with other techniques, for example, noise may be masked by applying multiple importance sampling between the area light surface and the phase function. Multiple importance sampling may be particularly useful and more effective than other line sampling distributions, as the systems and methods described here concentrate significant high variance noise close to the light's surface.

As the disclosed systems and methods employ importance sampling, the same are unbiased, have little or no memory requirements, can be implemented simply, and can be integrated easily into any Monte Carlo-based renderer. Systems and methods according to the principles disclosed here may be used to accelerate several light transport algorithms, including path tracing and bidirectional path tracing, as the method provides a generic sampling technique.

Other advantages will be apparent from the description that follows, including the figures and claims.

BRIEF DESCRIPTION OF THE DRAWINGS

FIG. 8 is a schematic depiction of a computing environment which may be employed to run the systems and methods described here, including a rendering module, shaders, sampling routines, ray tracers, and the like.

Like reference numerals refer to like elements throughout.

DETAILED DESCRIPTION

Figure 1:
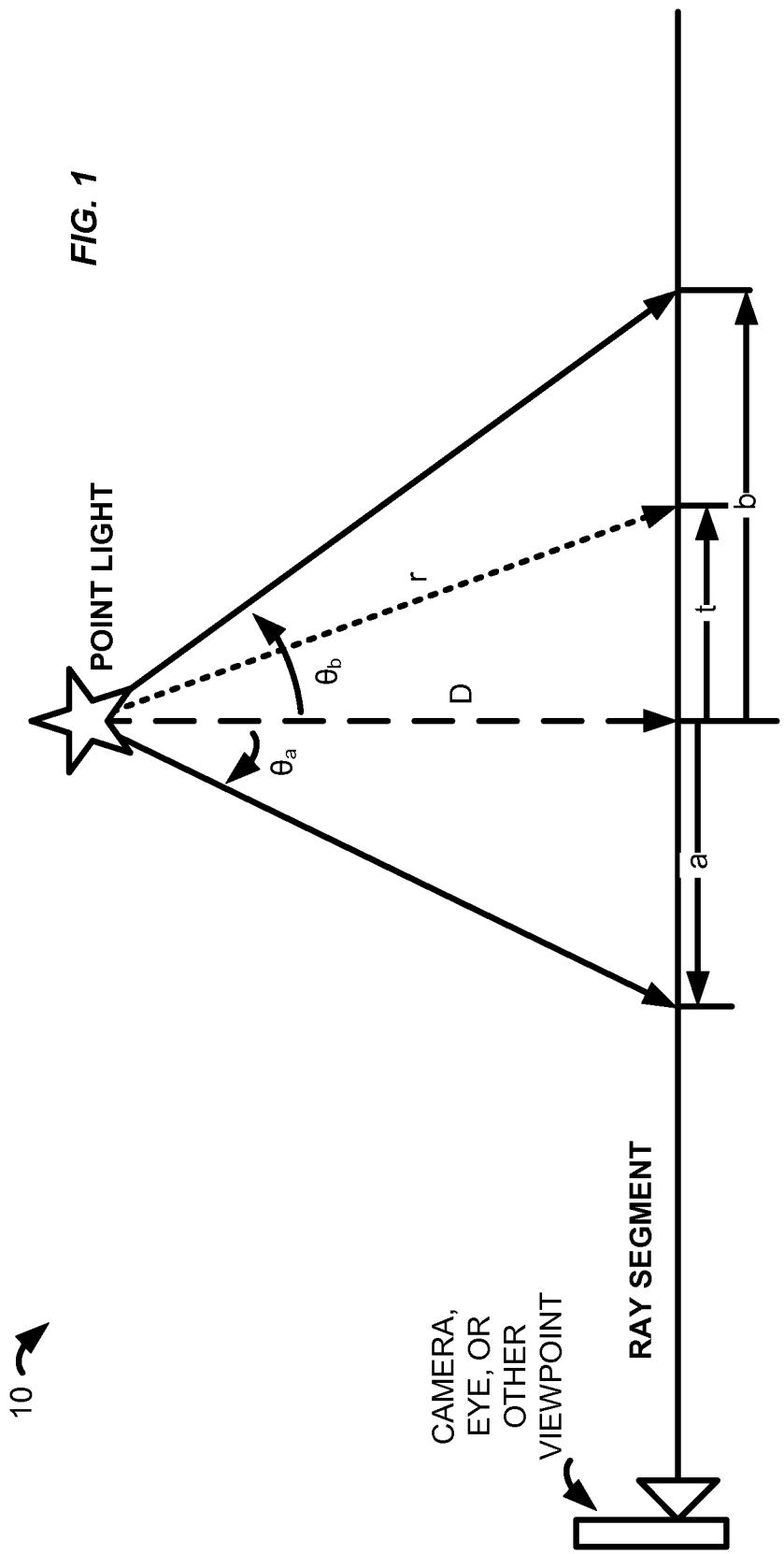
FIG. 1 illustrates schematically a rendering situation for homogeneous participating media.

The system 10 in FIG. 1 illustrates certain parameters in the below equation (1), which expresses the volume rendering for a single point of light in a homogeneous medium:

$$L(x, \vec{\omega}) = \int_a^b \sigma_s e^{-\sigma_t\left(t + \Delta + \sqrt{D^2 + t^2}\right)} \frac{\Phi}{D^2 + t^2} dt \qquad (1)$$

Where L is the radiance through a pixel, $\Phi$ is the power of the point light, $\Delta$ is the distance of the origin from the projection of the light onto the ray segment (this projection onto the ray at a distance D from the light source), r is the distance from the light source to any point on the ray, $\sigma_s$ is the scattering coefficient, which can be factored out due to the homogeneity, and $\sigma_t$ is the extinction coefficient.

Figure 2:
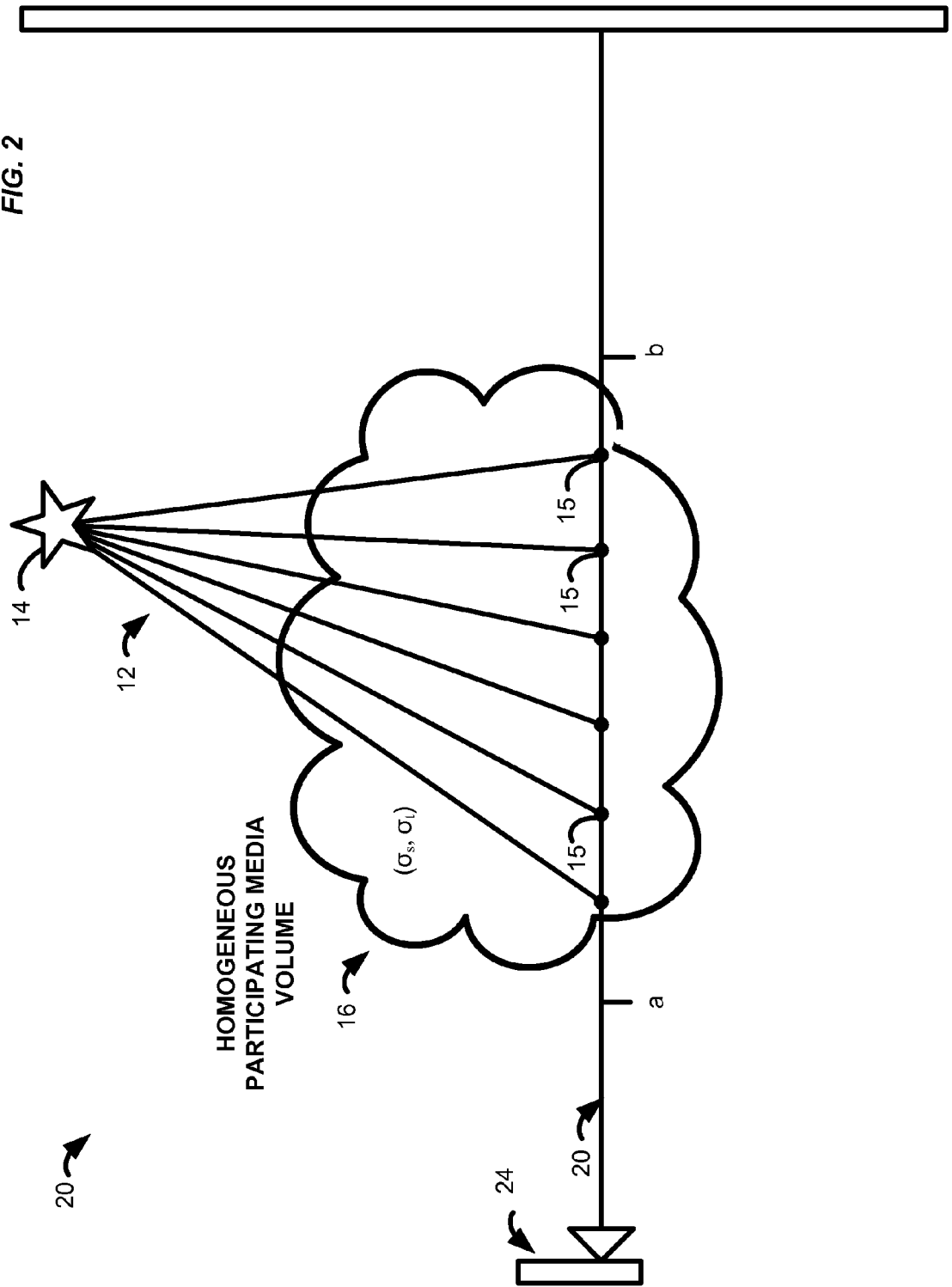
FIG. 2 illustrates schematically a rendering situation for homogeneous participating media where a number of points are sampled along a ray.

To evaluate the integral in equation (1) for homogeneous participating media, the arrangement of FIG. 2 is employed, in which a number of sample points 15 are taken along the ray segment 20, which is defined incident on a pixel or other such point, which is essentially a point on a plane of the viewpoint of a camera 24, equivalently, a point on a viewer's eye. Many such rays are defined (not shown for clarity), as set by the resolution desired to be. The combination of all such rays results in the final rendered image.

The ray 20 passes through the homogeneous participating media volume 16. A number of light rays 12 are illustrated as reaching respective sampling points 15 along the ray 20 from the light source 14, which for now is considered a point light source. In this estimation, the light rays reach the sampling points and are scattered towards the camera 24, being subjected to scattering with coefficient $\sigma_s$ and extinction with coefficient $\sigma_t$ associated with the homogeneous participating media 16.

The resulting sum over such sampled points is shown in the below equation (2):

$$L(x, \vec{\omega}) = \frac{\sigma_s}{n} \sum_{i=1}^{n} \left( e^{-\sigma_a\left(t_i + \Delta + \sqrt{D^2 + t_i^2}\right)} \frac{\Phi}{D^2 + t_i^2} \right) / pdf(t_i) \qquad (2)$$

Where $\sigma_s$ has been factored out due to the homogeneity.

The ways in which the samples points 15 are distributed may vary.

In one implementation, the sample point distribution is determined as follows. The probability density function is set proportional to the lighting term, which has a $1/r^2$ dependence. For example:

$$pdf(t) \alpha \frac{1}{D^2 + t^2} \qquad (3)$$

Figure 3:
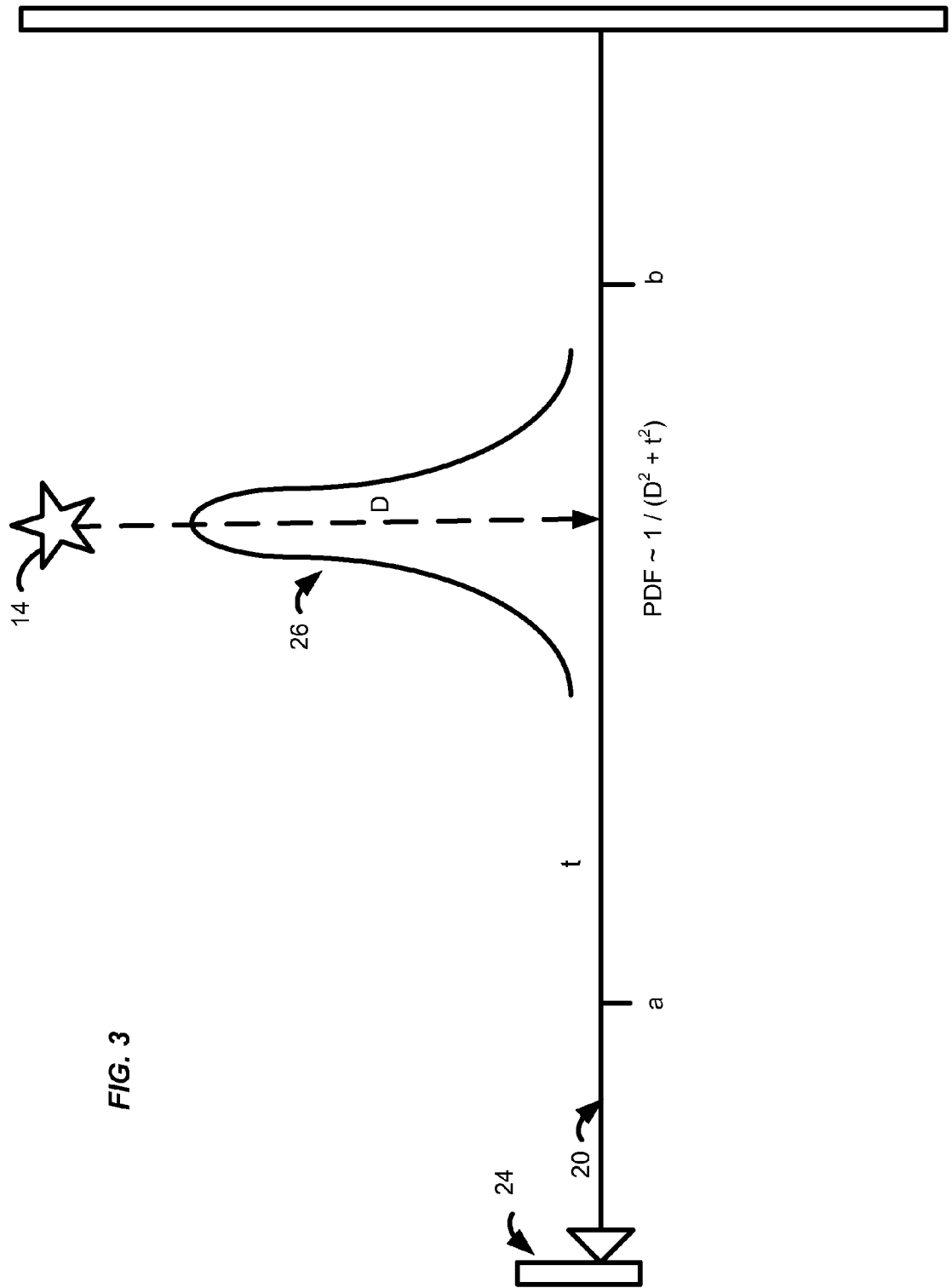
FIG. 3 is a graph illustrating a probability density function proportional to a lighting term having a $1/r^2$ dependence.

Such a probability density function is illustrated by the curve 26 in FIG. 3.

By integrating the probability density function to obtain the cumulative density function and then using the obtained cumulative density function to normalize the probability density function over [a,b], a probability density function is obtained as in equation (4):

$$pdf(t) = \frac{D}{(D^2 + t^2)(\theta_b - \theta_a)} \qquad (4)$$

Returning to and inverting the cumulative density function obtains the distribution (5) for the sampling points $t_i$ for $\xi_i$ [0,1), $\xi_i$ being a random number for each point:

$$t_i = D \tan[(1-\xi_i)\theta_a + \xi_i\theta_b)] \qquad (5)$$

Figure 4:
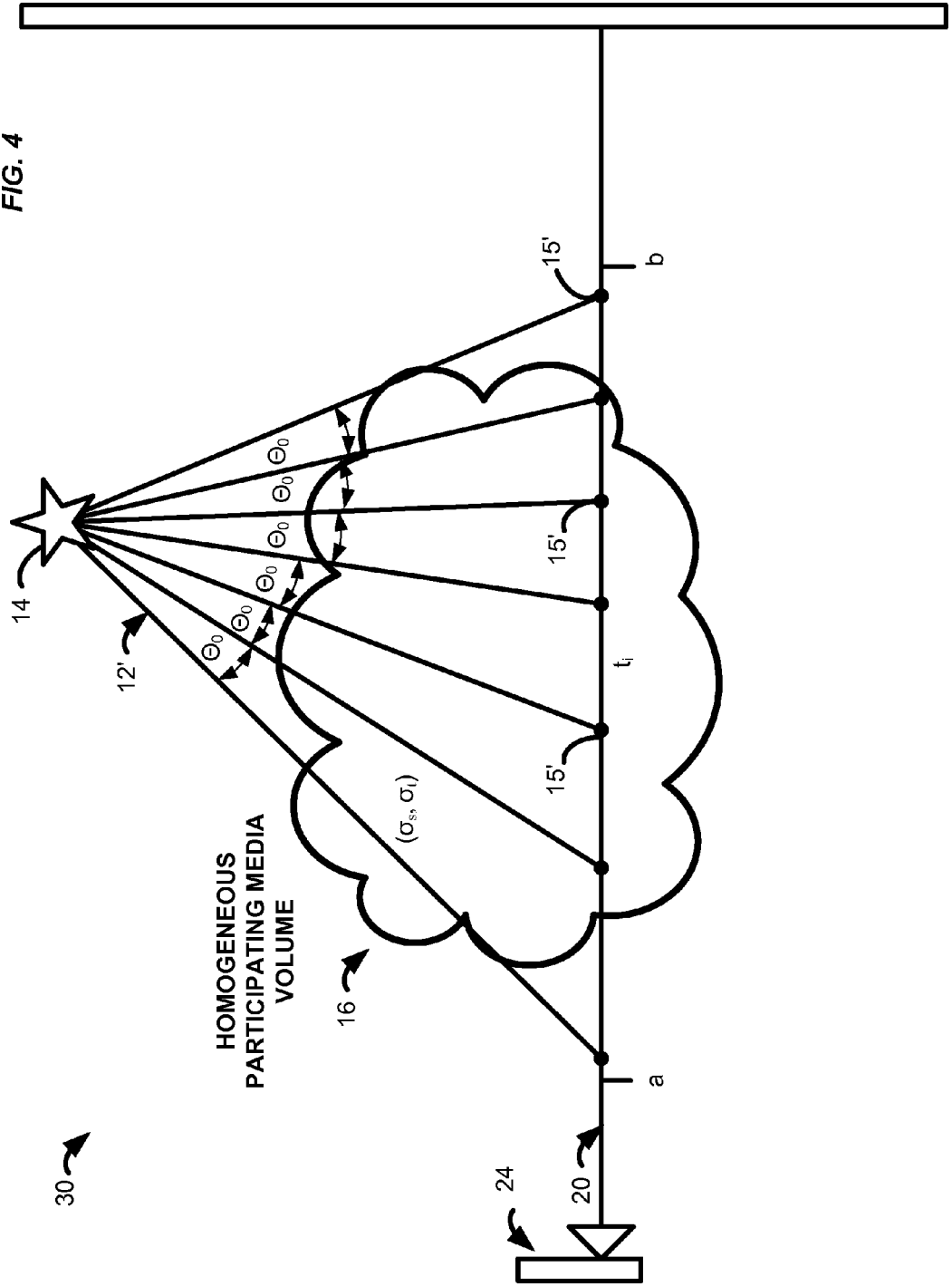
FIG. 4 illustrates schematically a rendering situation for homogeneous participating media according to the present principles where a number of points are sampled in an equi-angular fashion along a virtual ray.

As can be seen, equation (5) leads to an equi-angular distribution of points 15', as seen in FIG. 4 (where only three are enumerated for clarity). FIG. 4 illustrates that the angles which are "equi-angular" are those defined by the point light source and any two adjacent sampling points, illustrated in the figure by $\Theta_0$. It will be understood by one of ordinary skill in the art given this teaching that an equi-angular distribution of points may also be achieved in a number of other ways. However determined, the equi-angular distribution of points has been shown to provide superior results and to result in a lesser number of points requiring sampling than in prior techniques.

The above analysis pertains to the case of a point light source. In general, for area lights, the equation becomes more complex because of the inclusion of a nested integral over the surface of the light. In a specific example, the distance D, previously constant, is now a function of the position sampled from the light. Various assumptions may be made to simplify this situation. For example, an arbitrary point may be chosen, such as the center of the light, and the integral may be calculated with respect to this point. However, while such an approximation works well for small light sources, it fails as the light becomes larger. In particular, edges of the light source become noisier as the $D^2$ term in the probability density function begins to dominate. In addition, the error is high it is localized position, the perimeter, and such localized errors tend to be highly noticeable to viewers.

Figure 5:
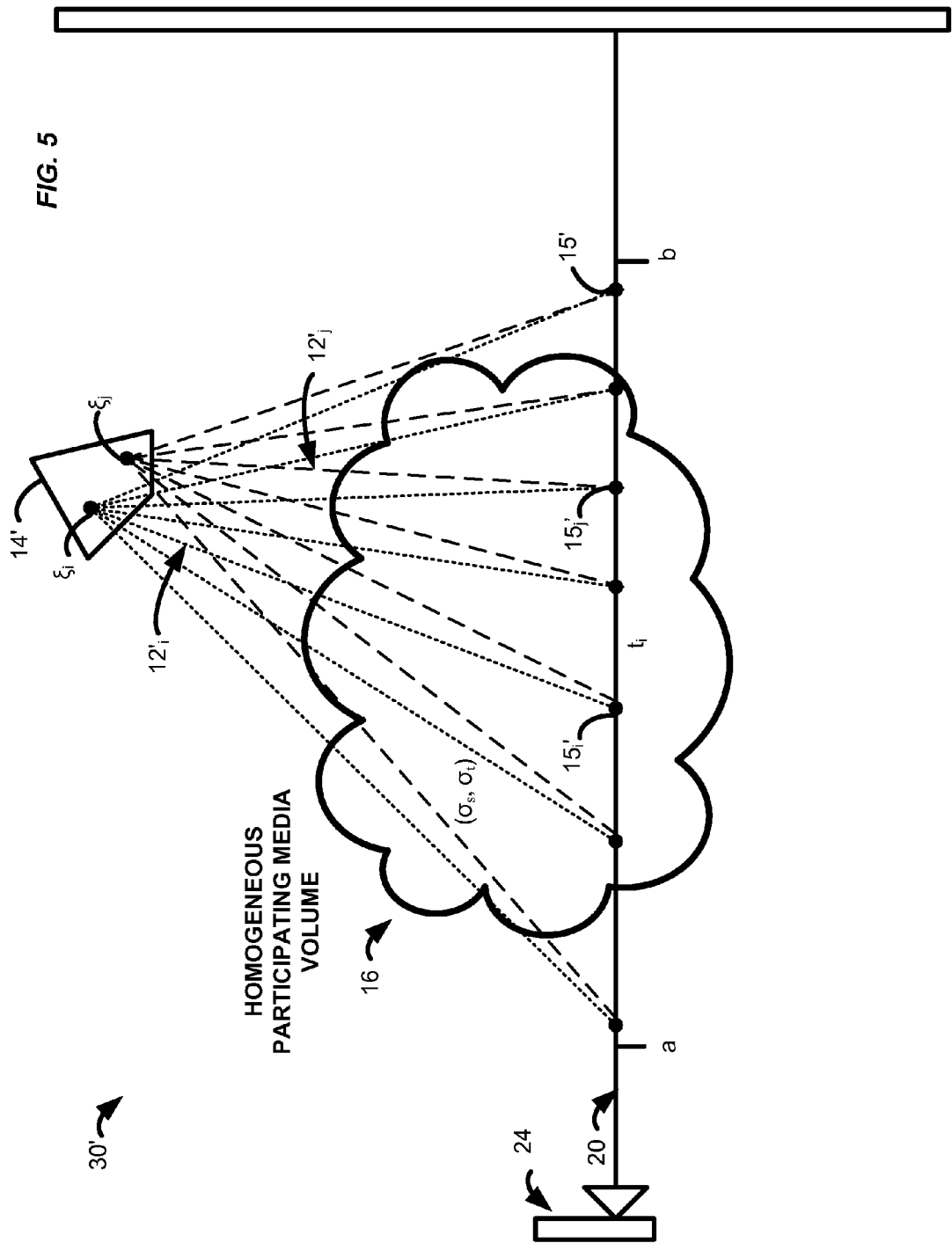
FIG. 5 illustrates schematically a rendering situation for homogeneous participating media illuminated by an area light.

Referring to FIG. 5, the system of FIG. 4 is illustrated as extended to the case of area lights. The error from the non-constant D is distributed by selecting, for each point on the ray 20, a random point $\xi_i$ in the arbitrary area light from which to calculate the rendering, the random point being generally changing, i.e., re-randomizing, with each different sampling point.

In more detail, the equi-angular sampling points 15' are illustrated as receiving transmitted light from an arbitrary area light source 14'. For one sampling point $t_i$, a contribution from dotted rays 12'$_i$ is seen from a random point $\xi_i$. For another point $t_j$, another set of equi-angular rays, dashed rays 12'$_j$, results in a contribution from another random point $\xi_j$. By performing the sampling in this manner, the error from the area light may be substantially uniformly distributed over the surface of the light. Excellent results have been obtained using this technique.

It will be understood that other methods are also possible. For example, instead of employing the same set of equi-angular points for each $\xi_i$, different equi-angular points 15' may be employed for each $\xi_i$.

Figure 6:
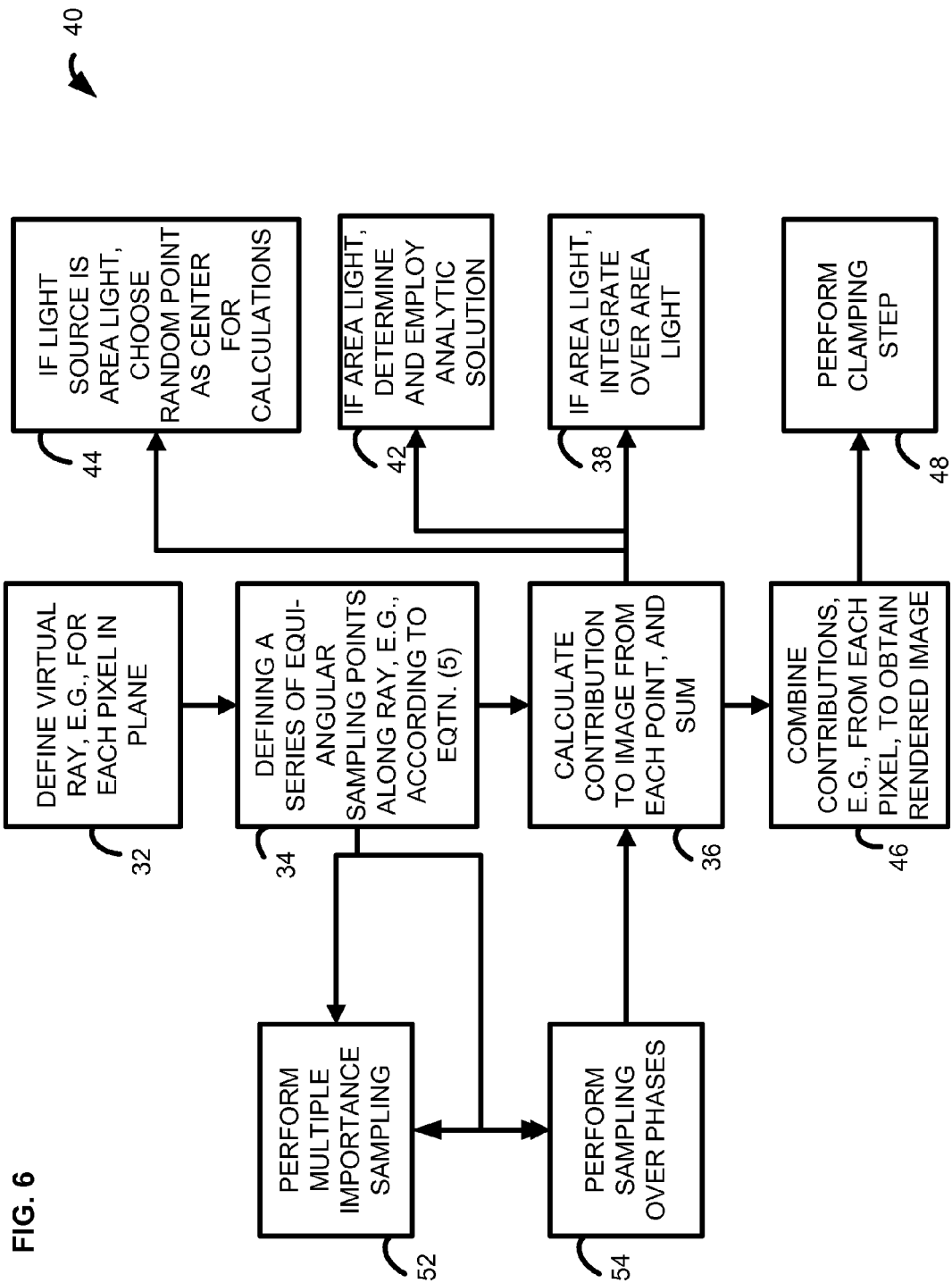
FIG. 6 is a flowchart of a method to provide rendering for homogeneous participating media according to the principles described here.

Referring to FIG. 6, a flowchart 40 is illustrated to implement an exemplary method according to the principles disclosed. In a first step, a virtual ray is defined (step 32). In this step, a pixel or other point on a plane representing a camera or a viewer's eye is defined as having a ray emanating from the same. The ray is generally perpendicular to the plane, although variations may be understood. On the virtual ray will be defined sample points from which contributions to the image at the pixel will be summed, resulting in an appropriate image at the pixel, the appropriate image being generally represented by a color applied by a shader. In this regard it is noted that shaders are generally computer programs used to calculate rendering effects, usually through a graphical processing unit.

A next step is that a series of equi-angular points are defined along the ray (step 34). By equi-angular is meant that, given the light source and given the ray, the points are distributed such that a triangle formed by the light source and two adjacent points along the ray will have an angle subtended by the triangle, at the apex coincident with the light source, which will be the same for any such triangle formed by any two adjacent sampling points along the ray. In one implementation, such points are defined by equation (5). The above description has implemented two ways in which such equi-angular distributions may be defined for area lights, either before or after the selection of the random point on the light source. In some implementations, the ways may be combined.

A next step is that a contribution is calculated for the image or pixel from each point sampled (step 36). This contribution generally takes into account the power of the light, aspects of the homogeneous medium, e.g., coefficients of extinction, absorption, and scattering, and other such factors as are known. The contributions from each sampled point on the ray are generally summed to result in an overall contribution for the pixel or point.

Step 36 may be expanded in the case where an area light is considered. In particular, an area light is one which has some finite arial extent, as opposed to a point source whose arial extent is essentially zero. Such results in the "nested integral" described above. In some cases, if the calculation is not intractable, an integration may be performed over the area light for each sampling point. In many cases, such integration is not possible and so other solutions may be employed. For example, if the area light has some degree of symmetry, e.g., spherical, toroidal, rectangular, elongated or stretched rectangular, circular, or the like, it may be possible to find and employ an analytic solution for the contribution (step 42).

In another implementation, a random point within the area light may be chosen for use in calculations (step 44). Such has the benefit of being able to accommodate area lights of arbitrary shape and texture. If the equi-angular points along the ray have been chosen, the same may then be employed, with respect to the random point on the area light, to calculate the contribution to the pixel image. Alternatively, for each of the desired number of sampling points along the virtual ray, a new set of equi-angular points for each random point within the area light may be defined and used in the calculation.

Once the contributions for each point or pixel are calculated, a next step is that the summed or overall contributions for each pixel may be combined or collected together to result in a final rendered image (step 46). For example, an image is generally formed by several million pixels, and once an overall contribution is calculated for each, the final rendered image is complete.

Various steps may be taken to improve the rendered image. For example, if a degree of speckling or other visual defect is apparent, a clamping step may be performed (step 48). Alternatively, multiple importance sampling may be performed (step 52) during the sampling, in which various types of sampling are weighted and combined in order to improve the final result. For example, density sampling may be combined with sampling based on the light intensity. In another optional step, sampling may be performed over the phase function (step 54), this phase sampling omitted in the above calculation for simplicity. That is, the phase function may be considered in the integrand and summed over, e.g., as a product with the $1/r^2$ term.

Figure 7:
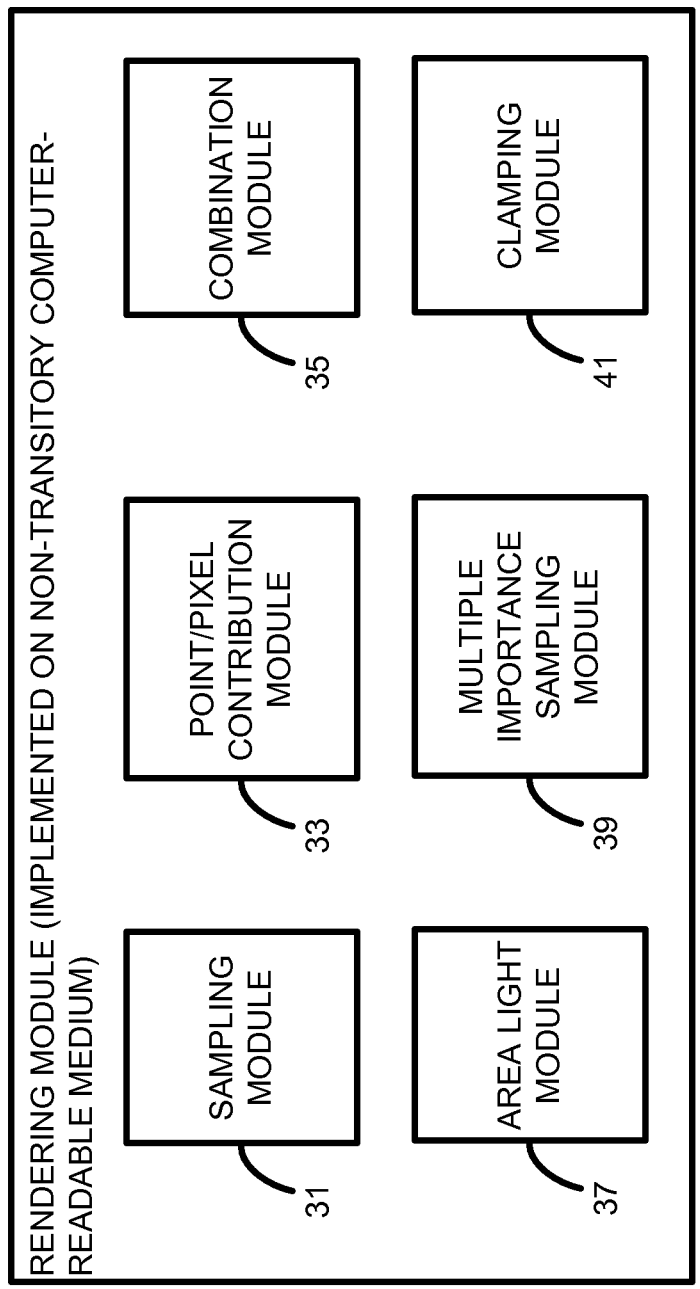
FIG. 7 illustrates a schematic depiction of a rendering module, which may be employed according to the principles disclosed here.

A rendering module implementable in hardware or non-transitory software is illustrated by the rendering module 50 of FIG. 7. In the module 50, a sampling module 31 is provided to perform the construction of sampling points along the virtual ray, e.g., in an equi-angular fashion. A point or pixel contribution module 33 is employed to calculate the effect on the point or pixel (or other camera or eye metaphor) at a virtual viewing plane due to a light source being sampled at the sampling points determined by the sampling module 31. In particular, such calculations are nontrivial due to the presence of homogeneous participating media in which at least some of the sampling points are disposed. A combination module 35 is employed to combine the colored or shaded points into a final rendered image.

An area light module 37 may be provided to allow a capability to consider the effects of the arial extent of area lights in the calculation disclosed above. In particular, the same may provide for a random sampling of the area light for each sampling point along the ray. In this way, the area light module 37 distributes the error due to the area light around the extent of the light. As such, the same is not concentrated in one location, e.g., at the perimeter of the light, the same being considered as far more distracting to a viewer than a distributed amount of error.

A multiple importance sampling module 39 may be employed to combine various sampling techniques to result in an even more improved final rendered image. For example, a density sampling routine may also be employed, and the multiple importance sampling module may be employed to retrieve and use the optimal results from each type of sampling. In addition, a clamping module 41 may be employed to reduce speckling or other visual defects in the image.

Figure 8:
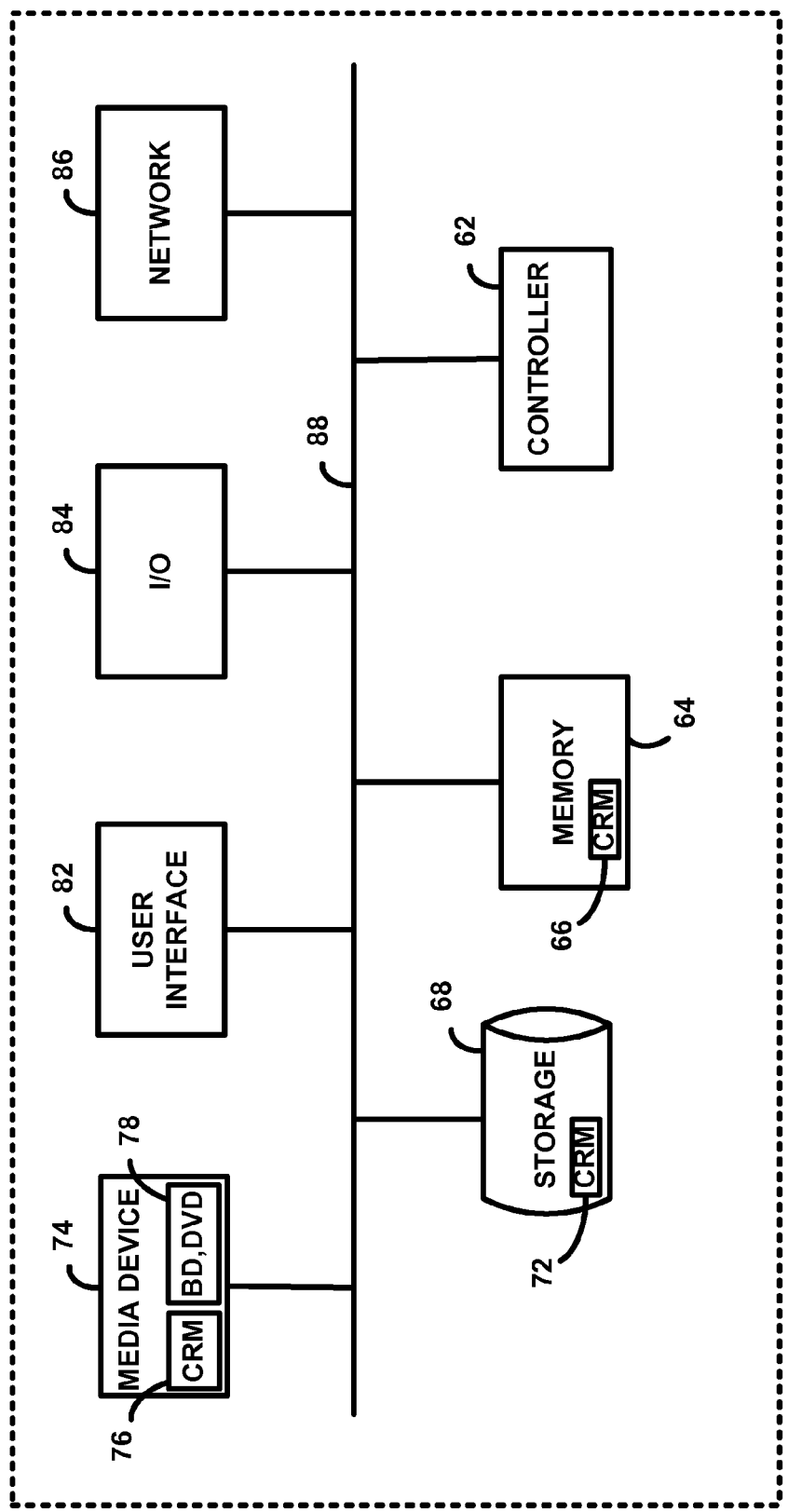

One implementation includes one or more programmable processors and corresponding computing system components to store and execute computer instructions, such as to execute the code that provides the various functionality, e.g., rendering, ray tracing, ray marching, sampling, and the like. Referring to FIG. 8, a representation of an exemplary computing environment is illustrated.

The computing environment includes a controller 62, a memory 64, storage 68, a media device 74, a user interface 82, an input/output (I/O) interface 84, and a network interface 86. The components are interconnected by a common bus 88. Alternatively, different connection configurations can be used, such as a star pattern with the controller at the center.

The controller 62 includes a programmable processor and controls the operation of the computing environment and its components. The controller 62 loads instructions from the memory 64 or an embedded controller memory (not shown) and executes these instructions to control the system.

Memory 64, which may include non-transitory computer-readable memory 66, stores data temporarily for use by the other components of the system. In one implementation, the memory 64 is implemented as DRAM. In other implementations, the memory 64 also includes long-term or permanent memory, such as flash memory and/or ROM.

Storage 68, which may include non-transitory computer-readable memory 72, stores data temporarily or long-term for use by other components of the computing environment, such as for storing data used by the system. In one implementation, the storage 60 is a hard disc drive or a solid state drive.

The media device 74, which may include non-transitory computer-readable memory 76, receives removable media and reads and/or writes data to the inserted media. In one implementation, the media device 74 is an optical disc drive or disc burner, e.g., a writable Blu-ray® disc drive 78.

The user interface 82 includes components for accepting user input, e.g., the user indications of volumes of participating media, light sources, and camera locations, and renders the resulting visual effects. In one implementation, the user interface 82 includes a keyboard, a mouse, audio speakers, and a display. The controller 62 uses input from the user to adjust the operation of the computing environment.

The I/O interface 84 includes one or more I/O ports to connect to corresponding I/O devices, such as external storage or supplemental devices, e.g., a printer or a PDA. In one implementation, the ports of the I/O interface 84 include ports such as: USB ports, PCMCIA ports, serial ports, and/or parallel ports. In another implementation, the I/O interface 84 includes a wireless interface for wireless communication with external devices. These I/O interfaces may be employed to connect to one or more content playback devices.

The network interface 86 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The computing environment may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Systems and methods according to the principles described here have provided a way for improved rendering using equi-angular sampling, as well as for extending the sampling to area lights in participating media. In this way, lighting computations within homogeneous participating media may be performed in an improved manner. It is noted that the specific embodiments and implementations described above are merely exemplary ways of performing the invention, and that variations will also be apparent to one of ordinary skill in the art given the teachings herein, including the figures.

For example, instead of employing a probability density function only proportional to $1/r^2$, other probability density functions may be employed that are specific or specially-optimized to the specific type of area light, e.g., specific to rectangular area lights, stretched rectangular area lights, circular lights, toroidal lights, quad area lights, and the like. Combinations of these may be employed to create a probability density function appropriate for arbitrary light sources.

It is noted that even in this technique certain noise, evident by, e.g., speckling, may remain in the rendered image. This remaining noise may be masked by applying multiple importance sampling between the area light surface and the phase function. As certain implementations of the method according to principles disclosed here have concentrated significant high variance noise close to the light surface, multiple importance sampling can be significantly more effective than with other line sampling distributions.

Accordingly, the present invention is not limited to only those implementations described above.

The invention claimed is:

1. A method of rendering a scene, the scene including a homogeneous participating media illuminated by a light source, comprising:
  a. defining a virtual ray extending from a point or pixel on a virtual viewing plane;
  b. defining a series of sampling points along the virtual ray, the sampling points spaced equi-angularly with respect to a light source;
  c. calculating a contribution to an image at the point or pixel from each sampling point due to illumination through a homogeneous participating media, wherein the sampling points are arranged according to a distribution:

$$t_i = D \tan[(1-\eta_i)\theta_a + \eta_i\theta_b] \text{ for } \eta_i \in [0,1)$$

i. wherein $t_i$ is a distance along the ray at which point "i" is located;
   ii. D is an orthogonal distance from the light source to the virtual ray;
   iii. $\theta_a$ and $\theta_b$ are angles between an orthogonal projection of the light source onto the virtual ray and a line from the light source to the points a and b on the ray, respectively; and
   iv. $\eta_i$ is a random number between [0,1); and
d. rendering an image based on the calculated contributions.

2. The method of claim 1, wherein the virtual ray is defined to be perpendicular to the plane.

3. The method of claim 1, further comprising summing each calculated contribution over the series of sampling points.

4. The method of claim 3, wherein virtual rays are defined for each point or pixel in the virtual viewing plane, and further comprising combining each summed contribution from each point or pixel to result in a rendered image.

5. The method of claim 1, further comprising:
   a. for each sampling point, defining a new series of sampling points along the ray, the new series of sampling points spaced equi-angularly with respect to the light source; and
   b. for each new sampling point in the series, choosing a random point within the area light, and basing the calculating on illumination from the random point.

6. The method of claim 1, wherein the light source is an area light source and is selected from the group consisting of: a spherical light source, a textured light source, a circular light source, a quad light source, a toroidal light source, a rectangular light source, and combinations of the above.

7. The method of claim 4, wherein the rendered image contains a plurality of high variance speckles, and further comprising masking the speckles by performing a clamping step.

8. The method of claim 4, further comprising performing a multiple importance sampling step.

9. The method of claim 1, further comprising a step of phase function sampling.

10. The method of claim 1, further comprising, for each contribution to be calculated, integrating over the light source and basing the calculating on the integration.

11. The method of claim 1, further comprising, for each contribution to be calculated, using an analytic solution for the illumination by the light source and basing the calculating on the analytic solution for the illumination.

12. The method of claim 1, wherein the defining a virtual ray, defining a series of sampling points, and calculating a contribution, are performed by a Monte Carlo-based renderer.

13. A non-transitory computer readable medium, comprising instructions for causing a computing device to perform the method of claim 1.

14. A rendering module, implemented on a non-transitory computer readable medium, for rendering scenes including homogeneous participating media illuminated by an area light source, comprising:
   a. a sampling module, implemented on a non-transitory computer readable medium, for constructing a series of sampling points along a ray, the sampling points spaced in an equi-angular fashion with respect to an area light source;
   b. an area light module for providing a signal pertaining to the area light, the signal providing a single random location within the area light and a light power associated with the location;
   c. a point contribution module, implemented on a non-transitory computer readable medium, for calculating the contribution of the area light source to an image of a homogeneous participating media at a point on a viewing plane, the calculated contribution resulting in a color to be applied at the point by a shader, the point contribution module receiving a signal from the area light module pertaining to the area light, the signal providing the single random location within the area light and the light power associated with the location, from which the contribution of the area light source is calculated; and
   d. a combination module, implemented on a non-transitory computer readable medium, for combining the colored points to result in a rendered image, and
   e. wherein the sampling module is configured to sampling points according to a distribution i. $t_i = D \tan[(1-\eta_i)\theta_a + \eta_i\theta_b]$ for $\eta_i \in [0,1)$ 1. wherein $t_i$ is a distance along the ray at which point "i" is located;
   2. D is an orthogonal distance from the light source to the virtual ray;
   3. $\theta_a$ and $\theta_b$ are angles between an orthogonal projection of the light source onto the virtual ray and a line from the light source to the points a and b on the ray, respectively; and
   ii. $\eta_i$ is a random number between [0,1).

15. The module of claim 14, further comprising a multiple importance sampling module for performing a multiple importance sampling step.

16. The module of claim 15, wherein density sampling is employed in the multiple importance sampling.

17. The module of claim 14, further comprising a clamping module for performing a clamping step on the rendered image.

* * * * *